H. I. MATTSON.
TWINE CUTTER.
APPLICATION FILED JUNE 28, 1909.
948,898.
Patented Feb. 8, 1910.
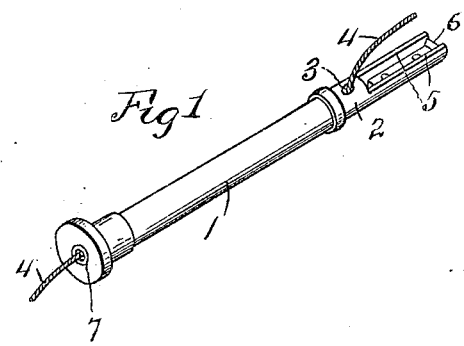
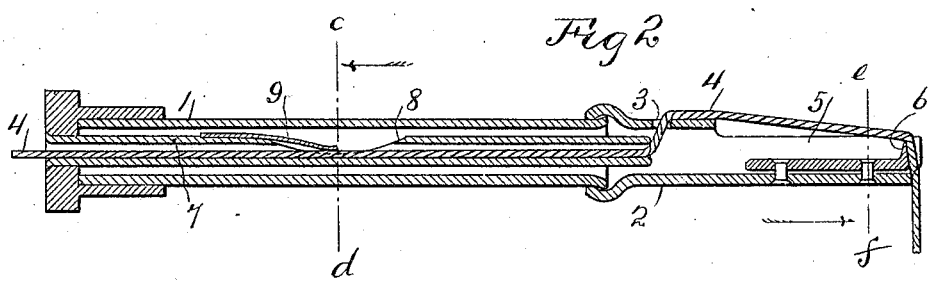
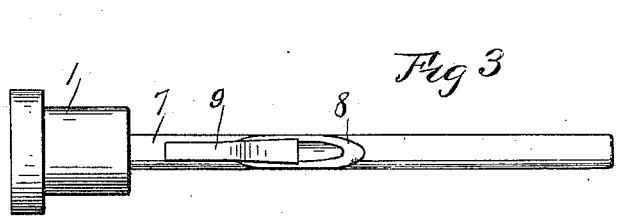
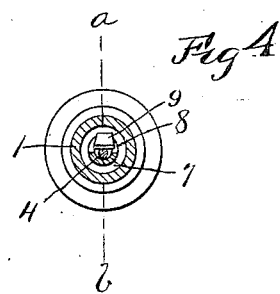
WITNESSES:
R. Hamilton
E. B. House
INVENTOR.
Harry I. Mattson
BY
Warren D. House
His ATTORNEY.

UNITED STATES PATENT OFFICE.

HARRY I. MATTSON, OF KANSAS CITY, KANSAS.

TWINE-CUTTER.

948,898.  Specification of Letters Patent.  Patented Feb. 8, 1910.

Application filed June 28, 1909. Serial No. 504,760.

*To all whom it may concern:*

Be it known that I, HARRY I. MATTSON, a citizen of the United States, residing at Kansas City, in the county of Wyandotte and State of Kansas, have invented certain new and useful Improvements in Twine-Cutters, of which the following is a specification.

My invention relates to improvements in twine cutters.

The object of my invention is to provide a simple, cheap and effective twine cutter.

The novel features of my invention are hereinafter fully described and claimed.

In the accompanying drawings which illustrate the preferred form of my invention, Figure 1 is a perspective view of my improved twine cutter. Fig. 2 is a longitudinal, vertical section, on the dotted line $a$—$b$ of Fig. 4. Fig. 3 is a top view of a portion of the handle and the tension device. Fig. 4 is a cross section on the dotted line $c$—$d$ of Fig. 2. Fig. 5 is a cross section on the dotted line $e$—$f$ of Fig. 2.

Similar characters of reference denote similar parts.

In the preferred form of my invention, the handle which carries the cutter and the tension device comprises preferably a tubular body portion 1, having rotatively mounted on its forward end a tubular end portion 2, which is provided with a lateral hole 3 for the passage therethrough of the twine, which is denoted by 4. One side, at the outer end of the rotary portion 2, is cut away, thereby forming two longitudinal parallel lips 5, which serve to guide the cord 4 against a transverse cutting blade 6, secured to the portion 2 between and lower than the upper edges of the lips 5.

Disposed centrally and longitudinally in the body portion 1 to which it is secured at its rear end, is a tube 7, provided with a lateral hole 8. A flat spring 9 has one end secured to the outer side of the tube 7, its other end extending through the hole 8 in a position in which it is adapted to press the twine 4 against the tube 7 through which the twine passes. The spring 9 and tube 7 serve as a tension device for releasably securing the twine in the handle.

In operating my invention the body portion 1 is grasped by the hand which carries the twine around a bundle that is being wrapped and tied. By reason of the portion 2 being rotative on the body portion 1 which is relatively stationary as regards the hand which grasps it, the twine does not become wound or twisted around the handle, but freely passes through the tube 7 and hole 3 as the bundle is being bound. When the bundle has been bound and the twine tied, the handle is manipulated so as to bring the twine between the lips 5 by which it is guided against the blade 6. The friction spring 9 holds the twine tightly enough to enable the blade 6 to cut the twine when pressure sufficient for the purpose has been exerted.

While it is preferable to have the part 2 rotative on the body 1, it is not essential to the operation of the invention.

I do not limit my invention to the precise tension device shown, as other tension means may serve.

Various modifications of my invention, within the scope of the appended claims, may be made without departing from its spirit.

Having thus described my invention, what I claim and desire to secure by Letters Patent, is:—

1. In a twine cutter, the combination with a tubular handle having a lateral hole through which the twine extends, of a tube disposed longitudinally in the handle for receiving therethrough the twine and having a lateral hole, a spring carried by said tube on the periphery thereof and extending through the lateral hole in the tube for exerting a pressure against the twine, and cutting means carried by the handle.

2. In a twine cutter, the combination with a tubular handle having a lateral hole for receiving the twine, one side at one end of the handle being cut away thereby providing two longitudinal oppositely disposed lips, of a cutting blade disposed transversely between said lips and lower than the lateral edges of said lips.

3. In a twine cutter, the combination with a tubular handle having a lateral hole for receiving the twine, one side at one end of the handle being cut away thereby forming two longitudinal lips, of a cutting blade disposed transversely between said lips and lower than the lateral edges thereof, and tensioning means for the twine carried by the handle.

4. In a twine cutter, the combination with a tubular handle having a lateral hole for the twine, one side at one end of the handle being cut away thereby forming two lips, of a cutting blade disposed between and lower than said lips transversely to the handle, a tube disposed longitudinally in the handle for receiving the twine, the tube having a lateral hole, and a spring secured on the outer side of the tube and extending through the lateral hole thereof and adapted to bear against the twine.

5. In a twine cutter, the combination with a tubular handle, of a tube disposed longitudinally in the handle for receiving therethrough the twine and having a lateral hole, a spring secured to the outer side of the tube and extending through said hole for bearing against the twine, and a cutter carried by the handle.

6. In a twine cutter, the combination with a handle having a relatively stationary tubular body portion and a tubular end portion rotatively mounted on the body portion and having a lateral hole for the twine, of cutting means carried by the rotary portion.

7. In a twine cutter, the combination with a handle having a relatively stationary body portion and a tubular end portion rotatively mounted on the body portion and having a lateral hole for the twine, one side at one end of the rotary portion being cut away thereby forming two lips, of a cutting blade disposed transversely between and lower than said lips.

8. In a twine cutter, the combination with a handle having a relatively stationary tubular body portion, and a tubular end portion rotative on the body portion and having a lateral hole for the twine, of cutting means carried by the rotary portion, and tensioning means carried by the handle for resisting movement of the twine therethrough.

9. In a twine cutter, the combination with a handle having a relatively stationary tubular body portion and a tubular end portion rotative on the body portion and having a lateral hole for the passage of the twine, of cutting means carried by the rotary portion, a tube for receiving the twine therethrough disposed longitudinally in the body portion and having a lateral hole, and a spring secured to the outer side of the tube and extending through the hole therein and adapted to bear against the twine.

10. In a twine cutter, the combination with a handle having a relatively stationary body portion and a tubular end portion rotative on the body portion and having a lateral hole for the twine and having one side at one end cut away thereby forming two lips, of a cutting blade disposed between and lower than said lips transversely to the lips, a tube for receiving the twine therethrough disposed longitudinally in said body portion and having a lateral hole, and a spring secured to the outer side of the tube and extending through the hole therein and adapted to bear against the twine.

In testimony whereof I have signed my name to this specification in presence of two subscribing witnesses.

HARRY I. MATTSON.

Witnesses:
E. B. HOUSE,
J. C. IRWIN.